Jan. 6, 1942.  H. Z. GORA  2,269,367
RUBBER VALVE STEM FOR PNEUMATIC TIRES
Filed Feb. 16, 1940
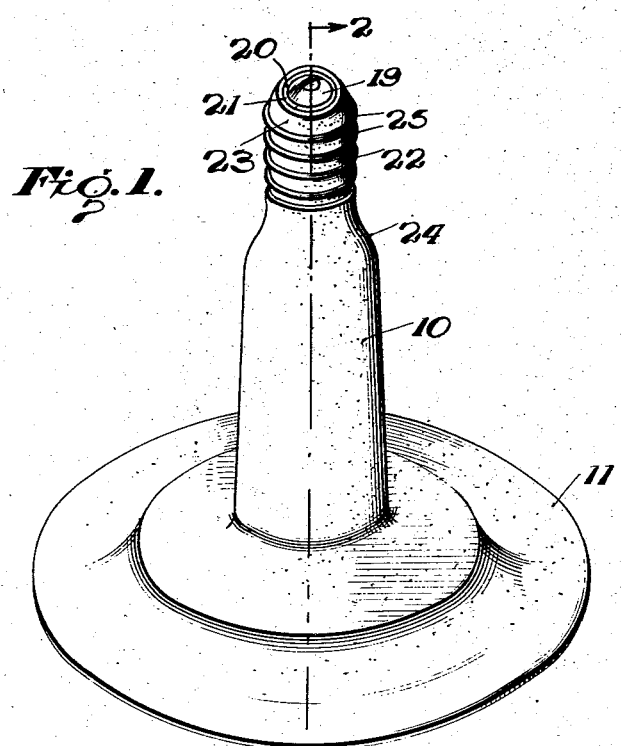
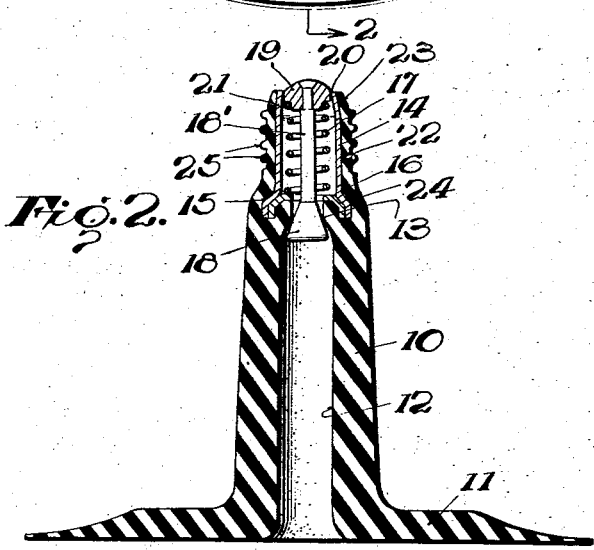
Inventor
Henry Z. Gora.
By Cameron, Kerkam & Sutton
Attorneys Patented Jan. 6, 1942

2,269,367

UNITED STATES PATENT OFFICE 2,269,367

RUBBER VALVE STEM FOR PNEUMATIC TIRES

Henry Z. Gora, Bridgeport, Conn., assignor to Jenkins Bros., New York, N. Y., a corporation of New Jersey Application February 16, 1940, Serial No. 319,359

1 Claim. (Cl. 152—429)

This invention relates to an improvement in rubber valve stems for pneumatic tires, and more particularly to rubber valve stems of the capless type.

Rubber valve stems for pneumatic tires are now known to the art wherein the stem bodies are formed of rubber but which include a tubular metal element entirely confined by the rubber body material and extending inwardly from the tip end of the stem for a lesser or greater distance depending on the type of service to which the valve stem is to be put, and wherein the passage through the stem is closed at or adjacent the outer end of the stem by an element on the valve pin, whereby a cap such as formerly used is unnecessary and not used. In such structures the tip end of the stem is reduced in diameter and given a generally cylindrical form of such size that it may be received within the sleeve or chuck of an inflation device or such as may be used in the factory when the stems are cured, etc., this portion of the valve stem therefore being constituted by a tubular metal element entirely confined within an exterior surrounding body of rubber that is relatively thin as compared with the thickness of the wall of the remaining portion of the rubber valve stem. Owing to the tolerances of manufacture some difficulty has heretofore been experienced in assuring that this tip portion of the valve stem shall establish and maintain a proper engagement with such a sleeve or chuck. Thus if the outside diameter of the tip portion of the stem is somewhat smaller than the inside diameter of the sleeve or chuck, though within manufacturing tolerances, leakage around the tip end of the stem may occur, the sleeve or chuck may slip with respect to the tip end of the stem, etc.

I have found that the foregoing difficulties may be largely if not entirely overcome by serrating or otherwise providing the tip portion of the stem with flexible projections, which will ordinarily be formed integrally with and from the rubber stem material. Preferably said projections take the form of ribs or ridges extending around the tip portion of the stem, in which event any suitable number of ribs may be provided, and while I preferably dispose them in planes at right angles to the axis of the stem, this is not essential. Such serrations or the like not only materially increase the frictional grip of the tip end of the stem with the sleeve or chuck referred to, but as they are yieldable with respect to the metal backed rubber which constitutes the body portion at the tip end of the stem, they readily adjust themselves to the interior of a sleeve or chuck disposed thereover, and thereby minimize leakage and otherwise greatly improve the engagement of the tip portion of the stem with any sleeve or chuck that may be disposed thereover either as a part of the manufacturing operations or as an incident to inflating operations during service of the valve stem.

It is therefore an object of this invention to provide a rubber valve stem of the capless type with means at the tip portion of the stem where a relatively thin wall of rubber is backed by a metal element confined therein with means for improving the engagement of said tip portion with a sleeve or the like that is disposed thereover as an incident to manufacturing, inflating, or other operations.

The invention is capable of being variously embodied, as will be apparent to those skilled in the art from the herein contained description, but a preferred embodiment is illustrated on the accompanying drawing. It is to be expressly understood, however, that the drawing is for purposes of illustration only, and is not intended to be a definition of the limits of the invention, reference being had to the appended claim for that purpose.

In the drawing,

Fig. 1 is a perspective elevation of an embodiment of the invention; and

Fig. 2 is an axial section therethrough on line 2—2 of Fig. 1.

Referring in greater detail to said drawing, 10 is a rubber valve stem of any suitable size, diameter, length, construction, etc., provided with any suitable base 11, such as is known to the art. Extending longitudinally through said stem is the usual air passage 12 which, in the preferred embodiment of this invention, is reduced in cross-section intermediate its ends as shown at 13 to provide a shoulder faced toward the base of the stem to constitute an integral rubber valve seat. Disposed in the rubber body material is a tubular metal insert 14 of any suitable form and construction which extends to the tip end of the stem and which may extend for various lengths toward the base of the stem depending upon the character of the stem, the service to which it may be put, etc. As illustrated, the metal insert 14 has an enlarged inner end at 15 which is embedded in the rubber body material around the valve seat 13 so as to act as a metal reenforcement therefor. Said metal element 14 also provides an enlargement of the air passage through the stem, and integrally formed on or attached to the inner end of said metal element 14 is an inwardly directed shoulder 16 which acts as an abutment for a coil spring 17. The valve member 18 may be of any suitable form and material but is here shown as frusto-conical in shape. Formed on or suitably attached to said valve member is a valve pin 18' to which is secured, at the outer end thereof, a head 19 that may slide through but which substantially fills the aperture 20 at the outer end of the metal element 14. As illustrated said metal element 14 has its inner wall somewhat inclined away from the axis as shown at 21 so that the passage through said element is of larger diameter below the aperture 20 at the end thereof, whereby when the head 19 is depressed against the tension of coil spring 17 to move valve member 18 away from its seat 13, air may flow freely around said head 19 because of the greater cross section of the passage through the metal element 14 away from the aperture 20. As so far described the rubber valve stem with its contained elements is representative of a type of capless rubber valve stem known to the art.

As will be perceived from the cross section of Fig. 2 the tip portion 22 of the stem as so far described is of generally cylindrical form, preferably slightly tapered at its extremity 23 and joined to the main portion of the stem by a shoulder 24, said tip portion being made of such diameter that it is designed to be received in a sleeve or chuck for inflation purposes, and also for certain operations during the course of manufacture. As also apparent from said cross section this tip portion 22, which confines and is backed by the metal element 14, is relatively thin as compared with the body portion 10 of the stem. Although the diameter of said tip portion may be selected for a snug fit within the sleeves or chucks which are to be disposed thereover as heretofore referred to, manufacturing tolerances preclude that said diameter shall agree exactly with the interior of sleeves and chucks which may be used therewith. Hence too snug engagement may occur in some instances, and too loose engagement may occur in others.

This difficulty has been obviated, in conformity with the present invention, by serrating or otherwise suitably providing said tip portion 22 with outwardly extending flexible projections, preferably formed of the rubber body material and integral therewith. In the preferred embodiment of the invention, said tip portion 22 is provided with a plurality of annular ribs 25. Any suitable number of ribs may be used, and they may be disposed along the entire extent of said tip portion 22, or only over a portion thereof. As illustrated four of such ribs are employed, and they are distributed with substantial uniformity along the length of tip portion 22, but this is not essential. Said ribs are preferably substantially parallel and at approximately right angles to the axis of the stem, but as before pointed out this is not essential. In fact they may even take the form of a helix, but it is to be expressly understood that they are not provided for the purpose of securing a cap on the stem, as the present invention is concerned only with the capless form of valve stem.

Whatever form the serrations, ribs, or the like may take, they are yieldable inasmuch as they are formed of the rubber of the valve stem proper, and therefore they greatly improve the grip of any sleeve or clutch of proper size that may be disposed in operative contact therewith, yielding to facilitate disconnection of the sleeve or clutch if the engagement is snug, and also yielding to permit engagement of a sleeve or chuck which within manufacturing tolerances may be of slightly smaller diameter than normal as well as frictionally engaging the inner wall of a sleeve or chuck of larger diameter, and in all cases making such a contact with the inner wall of the sleeve or chuck as to minimize leakage and otherwise improve the character of the engagement of the sleeve or chuck with the tip end of the stem.

While a preferred embodiment of this invention has been illustrated and described, it is to be expressly understood that within the principles herebefore disclosed, the invention may be embodied in other forms, and therefore reference is to be had to the appended claim for a definition of this invention.

What is claimed is:

In a rubber valve stem of the type including a rubber body portion terminating at its extremity in a top portion which is reduced cross sectionally with respect to said body portion to be received freely and telescopically within the sleeve or chuck of air inflation means and wherein at least the tip end of the air passage through the stem is provided with a tubular metal insert which is entirely covered circumferentially by the rubber at said tip end, said rubber covering at the tip end of said stem being relatively thin as compared with the thickness of the wall of said rubber body portion, means on said relatively thin and metal-backed rubber wall at the tip end of the stem for effecting an airtight engagement with the inner surface of sleeves or chucks when detachably engaged therewith notwithstanding variations in the interior dimensions of such sleeves or chucks, said means comprising one or more exteriorly extending flexible ribs projecting from and integral with the rubber wall at said tip end of the stem and adapted to be flexed to variable extents by, while maintaining an airtight and readily attachable and detachable telescopic connection with, the inner surfaces of different sleeves or chucks.

HENRY Z. GORA.